UNITED STATES PATENT OFFICE.

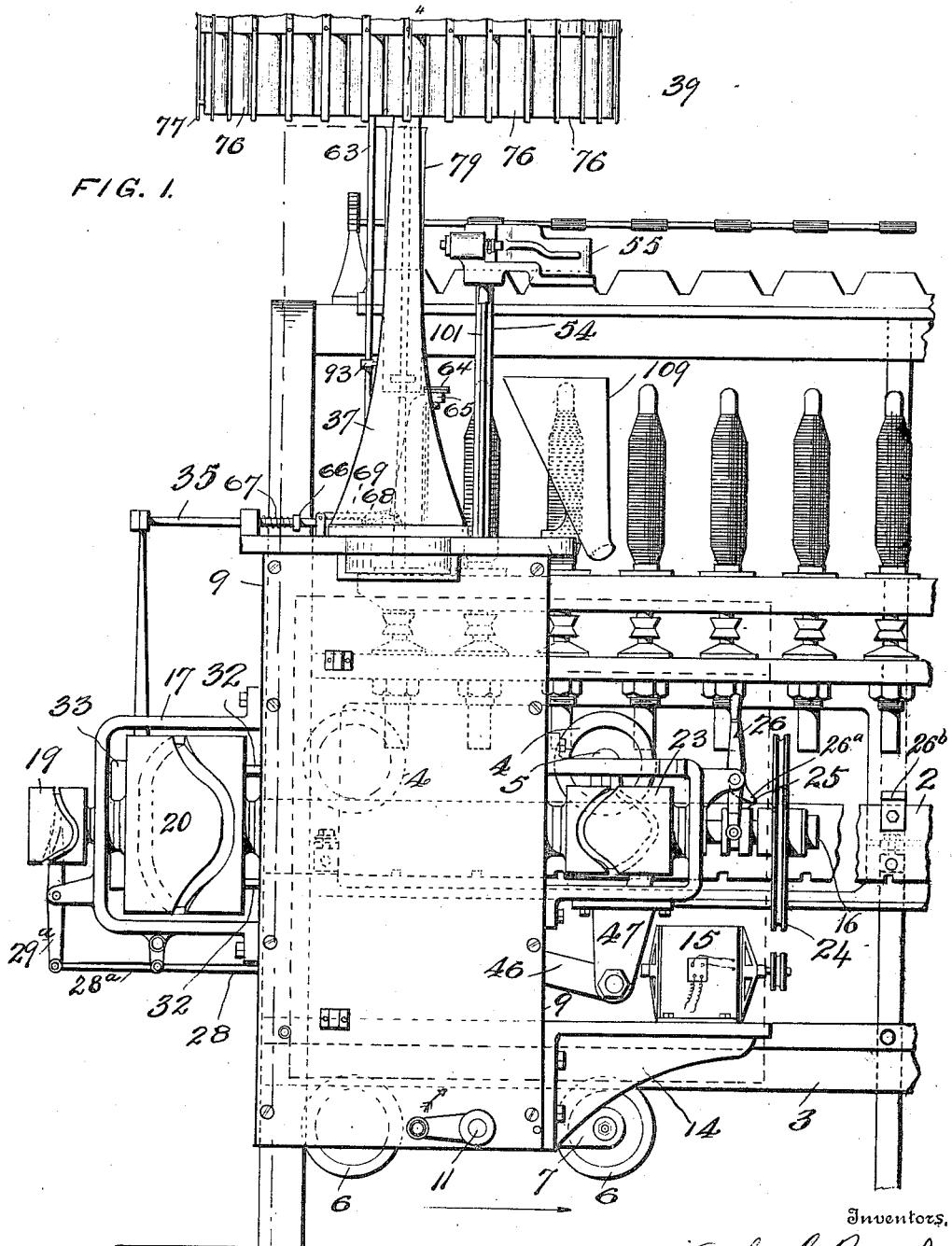

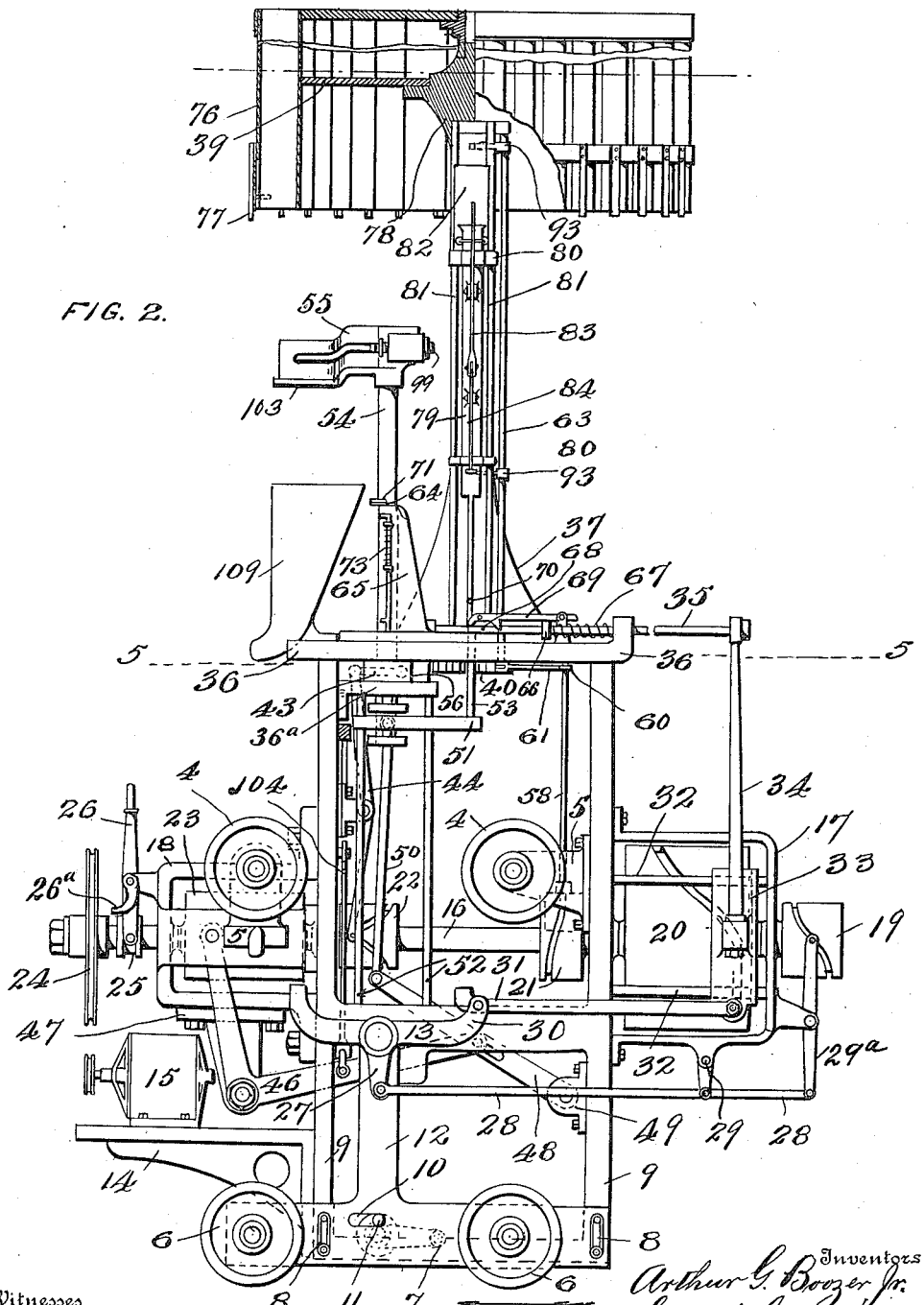

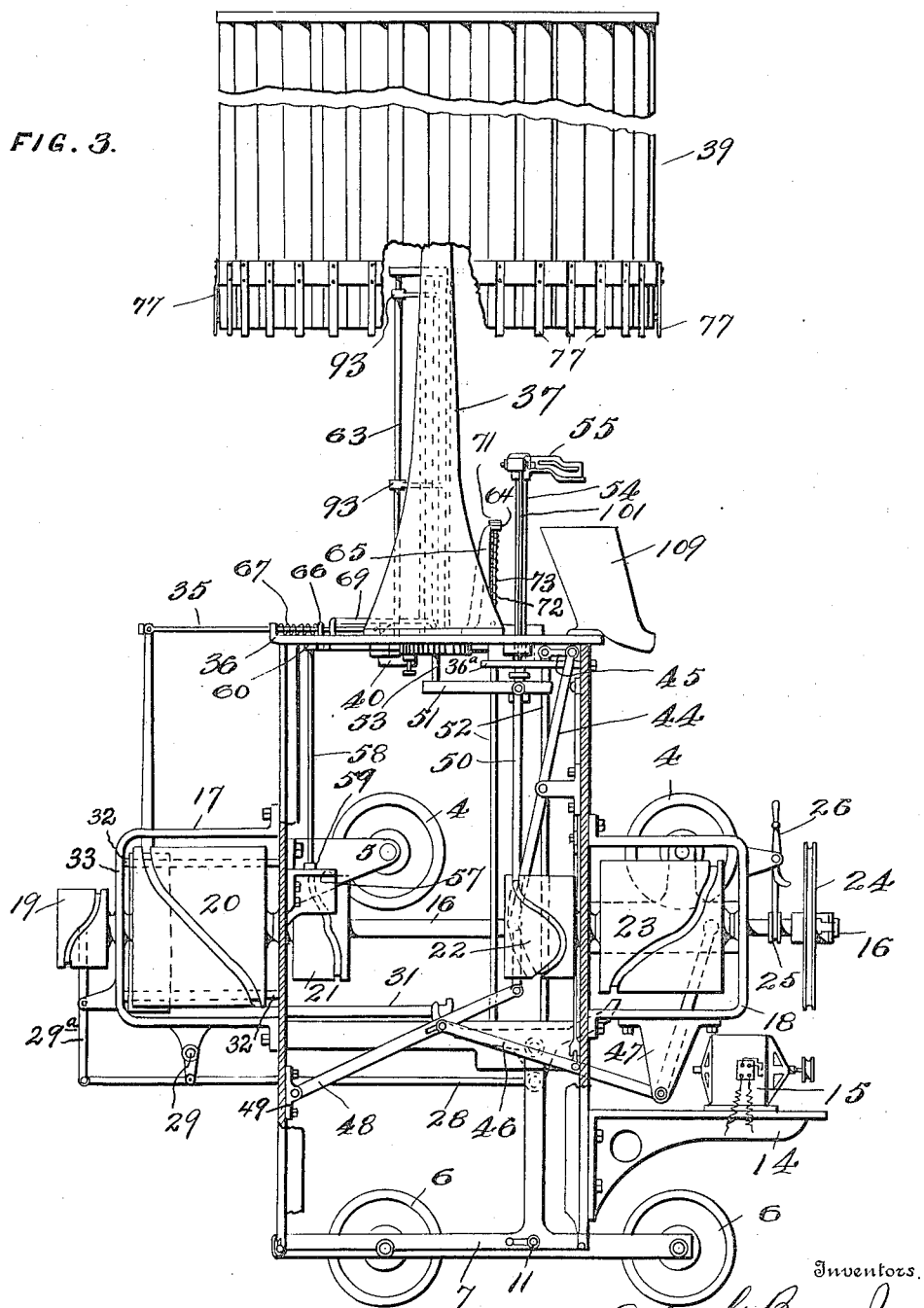

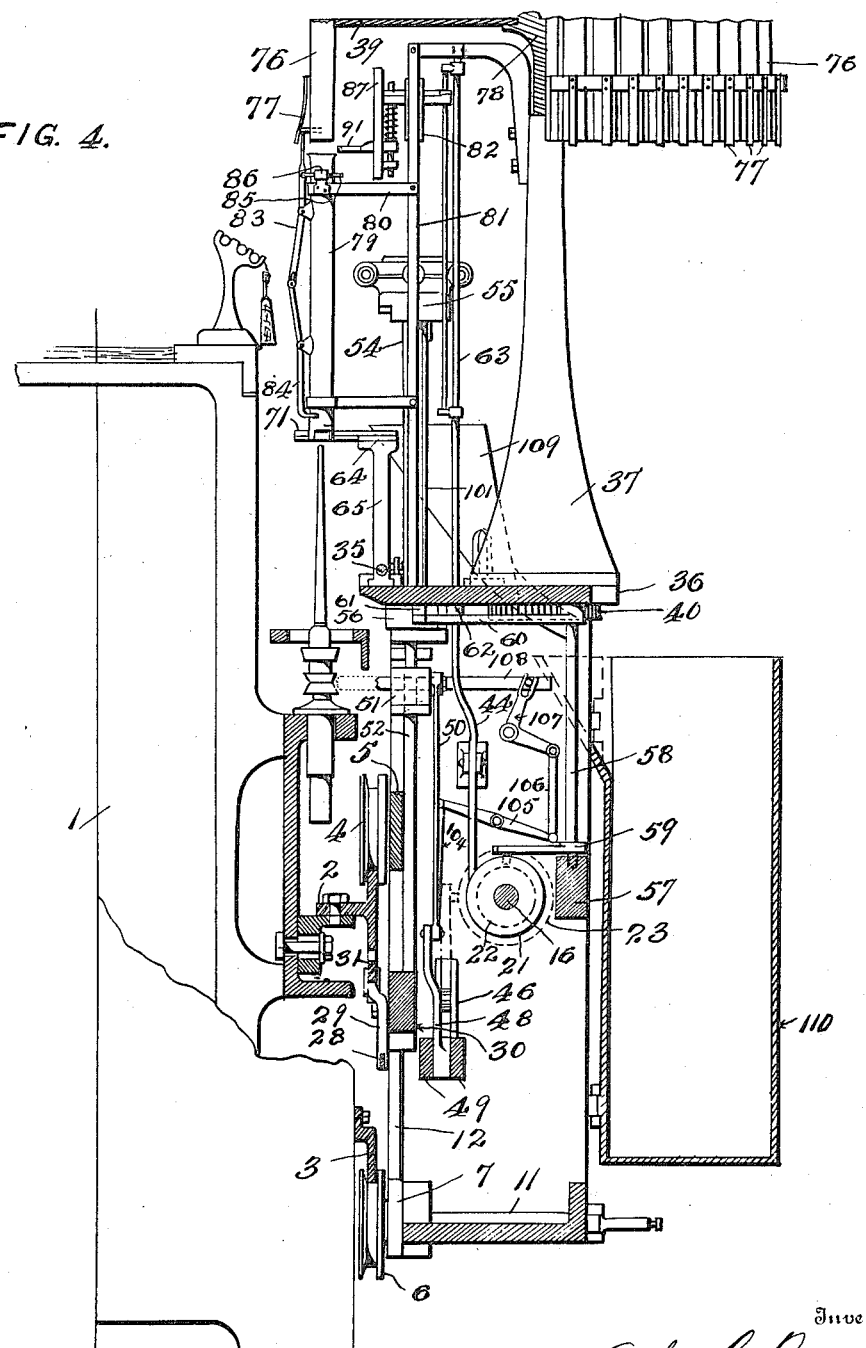

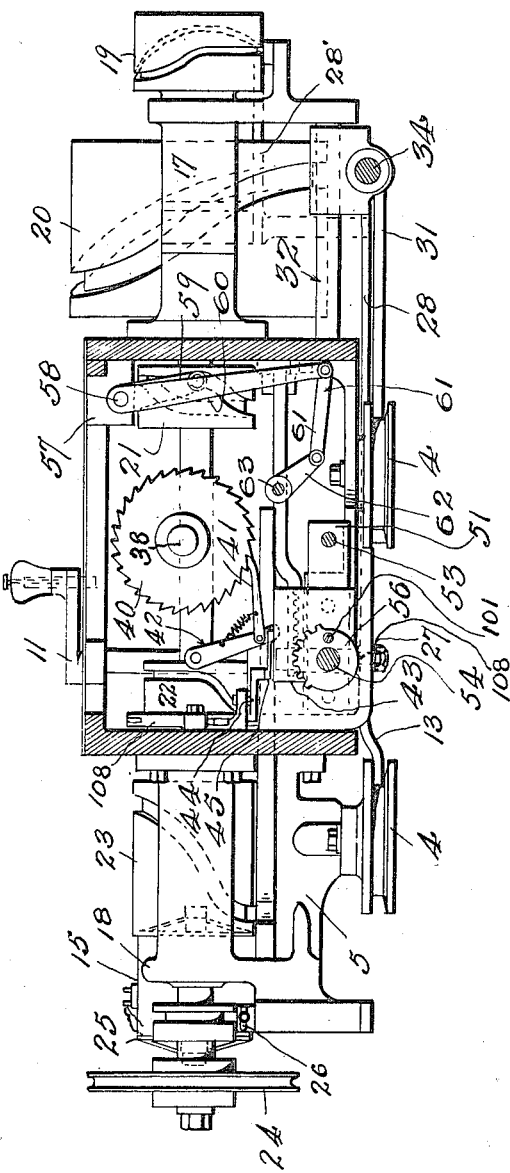

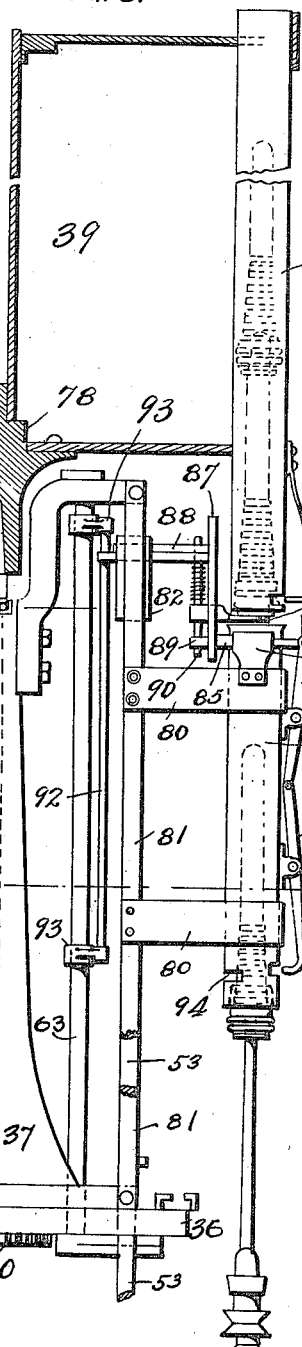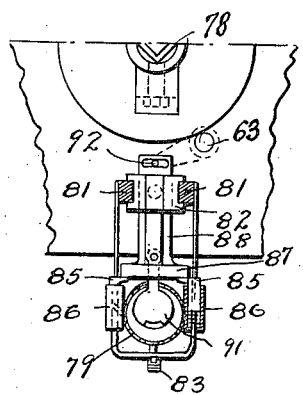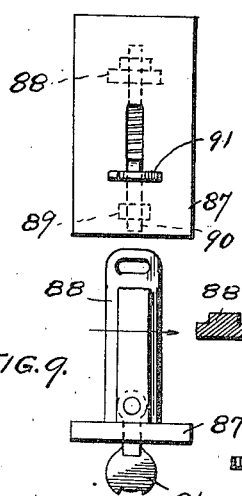

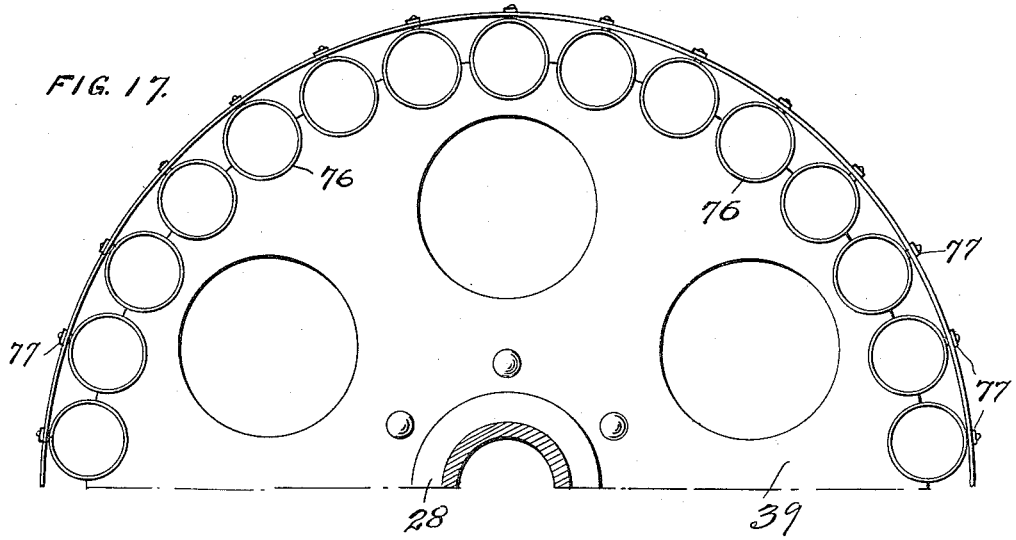

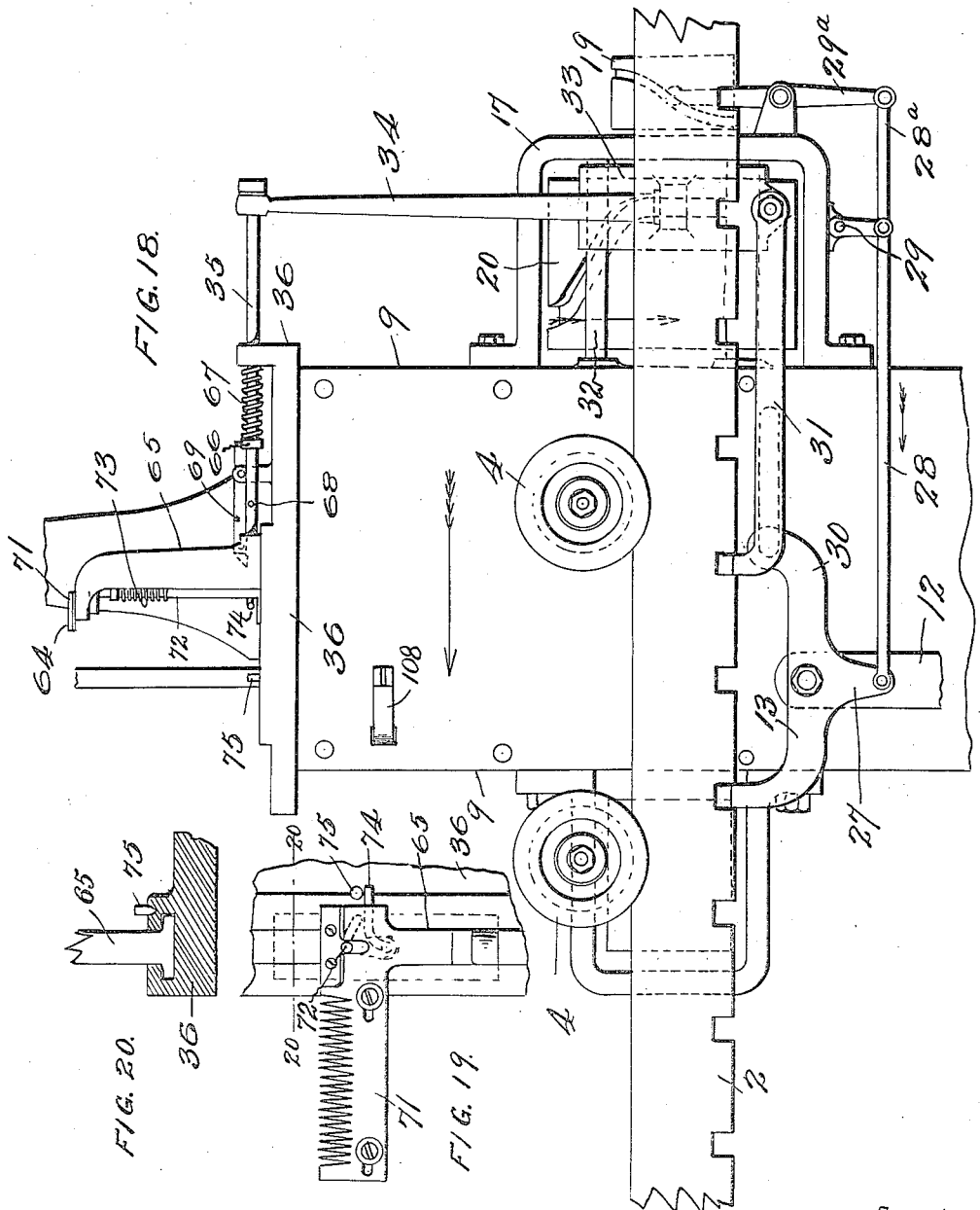

ARTHUR G. BOOZER, JR., AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

BOBBIN-PLACING AND BOBBIN-REMOVING ATTACHMENT FOR SPINNING-MACHINES.

1,142,010.      Specification of Letters Patent.      Patented June 8, 1915.

Application filed November 8, 1907. Serial No. 401,308.

*To all whom it may concern:*

Be it known that we, ARTHUR G. BOOZER, Jr., and GEORGE HILL, citizens of the United States, residing at Tucapau, in the county of Spartanburg and State of South Carolina, have invented certain new and useful Improvements in Bobbin-Placing and Bobbin-Removing Attachments for Spinning-Machines, of which the following is a specification.

This invention relates to certain new and useful improvements in attachments for spinning machines, the purpose being to provide mechanism for removing filled bobbins or quills from the spindles, the mechanism also placing empty bobbins or quills on the spindles, the attachment in use being connected to the frame of ring-spinning or ring-twisting machines.

A machine made in accord with our invention includes a magazine which in the present instance is rotatable and has a circumferential series of vertical chambers for the reception of a plurality of empty bobbins or quills, a guide tube that is supported to be in line with one of the chambers and a spindle when the machine is locked to the spinning machine, and means for releasing a single bobbin or quill from one of the chambers of the magazine and placing the same upon the spindle, after which the bobbin is engaged by a presser to force or seat the bobbin or quill on the spindle.

The machine also embodies doffing mechanism and in coöperative relation therewith reciprocatory means for holding the spindle against upward movement, a thread cutter for severing the thread while the bobbin or quill is held by the doffer, such thread cutter operating between the spindle and the bobbin or quill.

The machine also embodies means for moving the same step by step along the frame of the spinning machine, locking the attachment to the spinning frame and in operating the doffing and bobbin placing mechanism when the frame is locked to the spinning frame, so that the parts which engage the spindles or bobbins when on the spindles do not engage except when the machine is locked and then the direction of movement of the parts will not be otherwise than vertical.

The machine as an entirety provides automatic or mechanical means for holding a spindle against upward movement in its support when the doffer clamp exerts its initial pull upon the filled bobbin or quill, and when the filled bobbin or quill has been moved above the plane of the upper end of the spindle and the machine has started to move the thread cutter severs the thread, after which the bobbin is carried by the doffer over a funnel or bobbin guide and being released, falls into a receptacle supported by the attachment. When the doffer has removed a bobbin the attachment is automatically moved a space equal to the distance between two spindles and the bobbin placing mechanism in operative position is brought in alinement with the empty spindle and a bobbin or quill is guided thereon and is pressed or forced downward so that the bobbin or quill will be properly connected to the spindle, to turn therewith and clamp the thread between the spindle and bobbin. The doffing and bobbin placing attachment carries its own motor and means are provided for quickly attaching and detaching the same from a spinning or twisting frame; so that one attachment may be used for several machines.

In the accompanying drawings, which show a preferred form of a bobbin doffing and placing attachment for spinning machines constructed in accord with our invention; Figure 1 is a front elevation, showing the doffing and bobbin applying mechanism attached to the frame of a ring spinning machine. Fig. 2 is a rear elevation, and in this view a part of the bobbin-carrying-magazine is in section. Fig. 3 is a front elevation, the front covering plate being removed and a part of the frame being in section. Fig. 4 is an end elevation partly in section, the section being on line 4—4 of Fig. 1. Fig. 5 is a horizontal section on the line 5—5, Fig. 2. Fig. 6 is a side elevation partly in section of the bobbin or quill placing mechanism. Fig. 7 is a section on the line 7—7 of Fig. 6. Figs. 8, 9 and 10 are detail views of part of the means for pushing a bobbin or quill upon a spindle. Fig. 11 is a section on the line 11—11 of Fig. 6. Fig. 12 is a front elevation, and a plan view of the cross-head that carries the bobbin-presser or pusher. Fig. 13 is a part plan and section of the doffer-head. Fig. 14 is a vertical section of the doffer-head and part of its operating mechanism. Fig. 15 is a section on the line 15—15 of Fig. 13. Fig. 16 is a plan view of one of the gear wheels, and below the plan is a horizontal section thereof. Fig. 17 is a plan view of one-half of the bobbin carrying magazine. Fig. 18 is a rear elevation, showing mechanism for intermittently moving the attachment and connected parts. Fig. 19 is a plan view of the thread cutter, and Fig. 20 is a detail in section on the line 20—20 of Fig. 19.

Upon the drawings where a part of the spinning machine is shown it is designated by the numeral 1, and such spinning machine may be either a ring spinner or a ring twister, the same being of ordinary construction, except as to being fitted for the attachment of supporting and guide rails 2 and 3. The upper rail 2 carries the weight of the attachment and such rail has a horizontal flange for engagement with brackets that are made fast to the lower portion of the framing that is integral with the spindle rail. The lower edge of the rail 2 at points equal to the distance between the spindles has notches or recesses, and the guide rail 3, which is attached to the end and intermediate frames of the spinning machine, is maintained in vertical alinement with the supporting rail 2. One end of the rail 2 may have a projection or stop 26$^b$ fixed thereto in position to trip a lever and move a sliding member of a clutch on the drive shaft out of mesh with the hub of the drive wheel, so that, when the doffing and bobbin placing attachment reaches the end of the spinning frame, rotation of the drive shaft will cease. In practice each ring spinning frame or machine on each side is provided with rails 2 and 3 for supporting a doffer in such a manner that the doffer may be readily attached and detached for application to another similar spinning machine, it being customary in spinning mills to place a number of spinning machines in line with one another.

The frame or carriage of the bobbin doffing and placing mechanism is such as to provide a rectangular structure which is partially inclosed by covering plates, and the main supporting wheels 4—4 that engage the upper edge of the rail 2 are carried by stub axles that project rearwardly from brackets 5—5, rigidly connected to the carriage, and the lower guide wheels 6—6 are similarly secured to a vertically movable plate 7 having vertical slots 8 through which pass headed bolts for connecting the wheel carrying plate 7 to the lower ends of the rear vertical bars 9 of the carriage. The plate 7 is also provided with a horizontal slot 10, into which projects a stud attached to a disk on a cross shaft 11, the front end of the shaft having fast thereon a crank arm, the handle of uch arm being provided with a spring actuated catch to lock the shaft and frame. When the handle is placed horizontally, the pin that enters the slot will hold the plate 7 and attached guide wheels 6 so that the wheels engage the lower edge and sides of the rail 3. By providing vertically movable wheels the carriage may be readily attached and detached from the rails. The plate 7 has a vertical member 12 that supports a pivoted dog 13, one end, when raised, being adapted to engage with the notches in the lower edge of the upper rail 2, such dog forming one of the elements of mechanism for holding and advancing the carriage. The carriage on one side is provided with a bracket 14 for a support of a suitable motor 15 that drives the main shaft 16, such shaft being supported by brackets 17 and 18 and by bearings attached to the frame of the carriage. The main shaft has keyed thereon peripherally grooved cam wheels 19, 20, 21, 22 and 23, and on the end of the shaft opposite the cam 19 is the drive wheel 24, such wheel turning on the shaft when not engaged by the sliding clutch 25, the lever 26 for sliding the clutch being pivotally supported by a projection on the bracket 18. The main shaft 16 is rotated continuously in one direction while the carriage is intermittently moved along the spinning machine.

The dog 13 has a depending member 27, its lower end being engaged by a bar 28 (see Figs. 2 and 18), the other end of said bar engaging an arm on a rock shaft 29 which is journaled in bearings on the underside of the bracket 17, such rock-shaft being connected to a bar 28$^a$ that engages the vertically maintained lever 29$^a$ mounted in a projection on the vertical face of bracket 17. Said rock shaft has another arm connected by a link 28$^a$ to the lower end of a lever 29$^a$, the upper end of which has a stud that enters the groove in cam 19. The arm 30 of the dog 13 has a stud or pin which enters a recess or slot near one end of a bar 31, to move the bar 31 in and out of engagement with the notches in the rail 2.

The carriage and bracket 17 have guide bars 32 for a cross-head or slide 33, one end of the bar 31 being attached to the lower end of the slide. The slide 33 also carries an upright or arm 34 which moves in one direction a bar 35.

Referring to Fig. 18, it will be seen that the notch engaging end of the dog 13 is moved upward to enter a notch in rail 2 when the bar 28 is moved by the cam 19 in the direction which the carriage travels, and that such movement lowers the notch engaging end of the bar 31 below the plane of the bar 2, and out of a notch, in the rail, but when a reverse movement is imparted to the bar 28 the notch engaging end of the dog 13 is lowered and its opposite end is raised, so that for an instant both notch engaging ends of the dog and bar are in horizontal alinement and in the notches above such ends. Further movement releases the dog and carries the end of the bar 31 well into its notch and movement of the slide 33 forces the carriage one step forward, the length of such step being equal to the distance between adjacent spindles. The movement given to the slide 33 by the cam 20 is also utilized to operate a reciprocating thread cutter through the medium of the upright arm 34 and the bar 35, as will be hereinafter set forth.

The top or upper part 36 of the carriage has fast thereon a standard 37 having bearings for a vertical shaft 38, (see Fig. 6) the upper end of the shaft being key-ended to turn a revoluble bobbin magazine 39, the lower end of the shaft 38 being made fast to a ratchet wheel 40, which is intermittently rotated by suitable actuating mechanism to turn the shaft. The ratchet wheel 40, (Figs. 5 and 6) has the same number of teeth as there are chambers in the magazine. The under side of the ratchet wheel 40 is provided with conical recesses which are successively engaged by a spring actuated pin to hold the ratchet wheel and the spindle carrying magazine against accidental rotation. The ratchet wheel is actuated by a pawl 41 hinged on arm 42 (see Fig. 5), the slotted end of said arm engaging with a pin on the lower side of a horizontal slidable rack 43 which rotates the doffer head, as will be later explained.

A vertical lever 44 is actuated by the groove in cam 22 and imparts through link 45 motion to rack 43, (see Fig. 3) so that the magazine driving shaft is actuated step by step from the cam 22 on the driven shaft, said cam also actuating the means for imparting a partial turn in a horizontal plane to the doffer head. The cam 23 actuates a bell crank lever 46 (see Figs. 2 and 3) carried by a bracket 47 and the other end of the bell crank has a pin that passes through a slot in lever 48, which is fulcrumed on bracket 49 attached to one of the vertical bars 9 of the carriage. The free end of the lever 48 engages a link 50 which connects the lever with a vertically movable cross-head 51 mounted on guide bars 52. To the upper side of the cross-head 51 near its end there is attached a slide rod 53 for actuating the bobbin releasing and pressing mechanism, which will be hereinafter described in detail.

The cross-head 51 also carries rod 54 to which the doffer head 55 is attached. The rod 54 not only has a vertical movement given thereto by cross-head 51, and in addition thereto has a turning movement in a horizontal plane which is imparted to the rod 54 by a mutilated gear 56 (see Fig. 16) through which the rod slides. The gear 56 is rotatably mounted in bearing openings in the table 36 and in a horizontal bracket 36ª beneath the table, such gear being engaged by the rack 43 which is slidably guided between said table and bracket and is connected, as before indicated, by link 45 to lever 44 which engages cam 22.

The carriage has an inwardly projecting bracket 57 (Fig. 3) forming a support for a vertical rod 58 which extends to the under side of the top 36, and upon this rod are crank arms 59 and 60 (Figs. 4 and 5). The crank arm 60 has at its free end a link 61, connecting it to crank 62 on a vertical rod or shaft 63, such shaft being supported by passing through the top 36, and at its upper end by a bracket attached to the upper portion of the standard 37 (see Fig. 6). The rod 63 is turned in its bearings by motion imparted to crank 59 by groove in cam 21. When the carriage has started upon its travel, the thread cutter 64 is operated to sever the thread between the bobbin and spindle. The thread cutter is best shown in Figs. 18 to 20 and consists of a support 65 maintained in sliding engagement with an undercut guide slot in the top of the table 36, such support carrying the cutting elements and being moved by the bar 35 in the slot that guides the same.

The bar 35, which is attached at one end to the lower portion of the support for the thread cutter, has a collar 66 and surrounding the bar 35 between the collar and an upstanding guide-lug at one end of the table there is a spring 67. The bar 35 between the collar and point of attachment with the thread support has a pin 68 which is positioned to be engaged by a catch on bar 69, such bar being pivoted to an upward projecting bracket attached to the top of the table. The arm 34 loosely embraces the bar 35 and as the cross-head 33 is moved, the spring 67 is compressed and the support is moved in its ways and held by the catch 69, to hold the thread cutter out of the path of the doffer head 55 on its downward movement, and to sever the thread the catch is lifted out of engagement with the pin 68 by a trip 70 on the bar 53, such bar being attached to the cross-head 51 to move therewith. The trip 70 is spaced relative to the doffer head so as to release the bar 35 when the doffer head has raised the bobbin a short distance above the top of the spindle so that the thread will be cut between the lower end of the bobbin and the top of the spindle, and as the thread is cut while the bobbin is being raised, the thread being wrapped spirally about the spindle it is under tension in the path of the cutter.

The cutting device proper comprises a horizontally extending stationary shear blade mounted at the top of the support 65 and a slidable shear blade or knife 71 lying on top of the stationary blade. The sliding knife has an open end slot, the side walls of which are engaged by a pin on the end of a crank attached to a vertically supported rocker-bar 72, one of the bearings therefor being constructed to receive one end of a torsion spring 73, the other end of said spring being fastened to the bar 72. The bar 72 near its lower bearing has an outward projecting stud 74, and this horizontally projecting stud is in line with a stationary pin 75 which projects upward from the top 36, and when the bar 35 is released the spring 67 moves the bar 35 and the support 65 connected thereto so that the stud 74 will engage the pin 75 and move the knife blade 71 against the action of the torsion spring 73 to sever the thread between the raised bobbin and the spindle, as heretofore indicated.

The magazine 39 is made up to provide a circular series of vertical bobbin receiving tubes 76, preferably thirty in number, each tube being of sufficient length to carry four bobbins, each one above the other. The lower encircling band of the magazine has attached opposite each tube spring catches 77 (see Fig. 6). The inwardly projecting keepers of the catches 77 pass through slots above the lower ends of the tubes and beyond the keepers the springs extend below the lower ends of the tubes to be engaged by a suitable actuating device maintained in the path of the springs. The hub 78 of the magazine has a squared socket that fits over the upper squared end of the intermittently rotated shaft 38 by which the magazine is carried. The magazine may be readily raised and removed for filling, and it will be observed that it is maintained above so that the tubes thereof may be brought in direct vertical alinement with the spindles. A vertically slotted guide tube 79 is rigidly held in vertical alinement with the spindles by fixed arms 80 carried by rigid bars 81 which also serve as guide bars for a cross-head 82, the latter being mounted upon the upper end of the slide rod 53 and being vertically slidable thereby along the guide-bars 81. The guide tube on its outer face has fulcrumed thereon latch bars 83 and 84 which are connected betweeen their fulcrums so that they will move in unison, the upper latch bar 83 having means attached thereto for connecting the same to spring actuated plungers 85 seated in spring containing sockets 86 attached to the upper fixed arms 80. A vertically maintained slotted plate 87 is supported by a horizontal slide 88 which passes through a slot in cross-head 82, and the plate 87 below the slot has an apertured stud 89. The stud 89 and slide 88 form guides for rod 90, to which is attached a presser plate 91, a spring being interposed between said plate and the slide, the construction being such as to permit the presser plate 91 to have a vertical movement independent of the plate 87. The end of the slide 88 farthest from the plate 87 is slotted and through the slot passes a vertical rod 92 carried by cranks 93 that are attached to shaft 63, whereby, when the shaft 63 is rocked, the slide 88 and with it the presser bar 91 will be moved horizontally.

The guide tube 79 has a horizontal slot 94 (Fig. 6) through its wall adjacent to its lower end, and through such slot the presser plate 91 is withdrawn when it has reached the end of its downward movement. The withdrawal of the presser plate is effected by a partial revolution of shaft 63 effected by connections leading to cam 21 on shaft 16. When the presser plate is withdrawn from the vertically slotted guide tube 79, it is moved vertically until it reaches the limit of its upward movement, and it is then moved to place the presser plate 91 between the upper end of the guide tube and one of the chambers 39 of the magazine, the parts carrying the presser plate 91 having been moved out of line with the guide tube by a partial rotation of the shaft 63. Before completion of the horizontal movement of the presser plate 91 toward the guide tube, the lower portion of the face plate 87 engages the spring actuated plungers 85 and through the bifurcated connection attached to upper end of lever 83 forces such end of the lever outward so that its upper end will engage the depending end of the spring latch 77, and at the same time the lower inturned end of the lever 84 is moved out of the slot in the guide tube 79. It will be noted that the movements of latch 77 and lever 84 are simultaneous, releasing the lower bobbin in the chamber of the magazine so that such bobbin will rest upon the presser plate, the bobbin in the guide tube, being released to drop upon a spindle. In order to avoid any possibility of the fixed guide tube engaging the upper end of a bobbin when on the spindle, one side of the lower portion of the guide tube is cut away, as indicated by dotted lines, Fig. 6.

To the upper end of shaft 54 is secured a doffer head 55, (see Figs. 13 to 16) such head having to one side of its axis a recess in which reciprocates a vertical rack bar 95 that engages a pinion 96 formed integral with its shaft which terminates in a cam 97 that engages blocks 98 inserted in the arms forming the bobbin clamp of the doffer head. The arms of the doffer head 55 are pivoted to its main frame and the outwardly extending portions of said arms are pivotally connected to plungers 99, having collars against which bear springs 100, the tendency of said springs being to move the grasping portions of the arms toward each other to grasp a filled bobbin. The arms are opened by the cam 97, which is given a quarter turn by movement imparted to the pinion 96 through rack 95 attached to rod 101, such rod extending slidably through the mutilated gear 56 and having at its lower end a fixed collar 102. When a vertical movement is imparted to the bar 54 and the doffer head carried thereby, the rod 101 will follow the head until the fixed collar 102 engages the lower side of the mutilated gear 56 which is apertured for the passage of the rod 101, and when the collar 102 engages the underside of the gear 56, the vertical movement of rod 101 will be arrested and the doffer head, continuing its upward movement to the end of the stroke, causes the rack 95 to turn the pinion 96 as well as the cam 97, which opens the grasping members of the doffer head. At the end of the downward movement of the doffer head reverse movement is given to the rack and pinion, by engagement of the rack 95 with the mutilated gear 56 prior to the completion of the stroke of the doffer head, thus withdrawing the cam 97 and permitting the springs 100 to close the grasping members of the doffer head upon a filled bobbin. The doffer head below its grasping members is extended to form a ring 103, the diameter of which is substantially the same as the ring on the spinning-frame which is engaged by the traveler. The purpose of the ring 103 is to prevent the arms or grasping members of the head from catching the thread leading from the thread-board to the traveler, the pressure of the ring avoiding any possibility of the grasping members of the doffer head engaging the thread between the thread-board and the traveler while grasping the full bobbin. The ring also forms a support for the outer ends of the grasping members of the doffer head.

A guide 109 is mounted on the table 36 in position to receive filled bobbins which are released by the doffer head after it has been rotated out of line with the spindles, the bobbins passing through this guide 109 and thence into a receptacle 110, which is removably attached to the doffer carriage.

In many instances one or more of the guards with which the spindles of the spinning machine may be provided are broken or out of order, and in order to avoid lifting such spindles from their bearings we provide an auxiliary doffer-guard, which consists of a sliding bar 108 (Figs. 4 and 18), one end of which is shaped to engage the whirl of the spindle without undue pressure upon its driving band. The sliding bar 108 is connected to and actuated from the bell-crank lever 46 through the medium of the following elements: A rod 104 is connected at its lower end to the bell-crank 46 and at its upper end to one end of a lever 105 pivoted between its ends. The opposite end of the lever 105 is connected to a link 106 which engages one arm of a bell-crank lever 107, the other arm of the latter bell-crank lever being bifurcated to engage a pin carried by the sliding bar 108. As the bell-crank 46 is oscillated to lower the doffer head about a full bobbin on a spindle, the sliding bar 108 will be moved into engagement with the whirl on the spindle.

In use, the doffer is associated with the spinning-frame by hanging the wheels 4 on the guide-rail 2 and then adjusting the crank handle 11 to raise the plate 7 and carry the wheels 6 into engagement with the lower guide-rail 3, at the same time moving the driving members or dogs 13 and 31 into the notches in the lower edge of the rail 2, the carriage then being in position so that the doffer head will doff the first spindle. The lever 26 is now swung to throw the clutch member 25 on the cam-carrying shaft 16 into engagement with the hub of the drive-wheel 24, so that said shaft 16 will be driven from the motor. When the shaft 16 is rotated the bobbin-placing mechanism performs its movement at first in space or to one side of the first spindle on the spinning-frame, the function effected by the bobbin-placing mechanism in this first movement being to take an empty bobbin from the magazine 39 and deliver the same into the guide tube 79. The bobbin-removing or doffing mechanism which is in operative position above the first spindle passes downwardly about the full bobbin thereon and during such downward movement of the doffer head the doffer guard or bar 108 is brought into engagement with the whirl on the spindle. The doffer head having reached the limit of its downward movement, which is about the center of the bobbin, the grasping members close upon the thread on the bobbin after which the doffer head starts upon its upward movement, and when the bottom of the bobbin is raised to a point where it will clear the spindle, the thread cutter 64 is moved into operative position and the reciprocating knife 71 is actuated to cut or sever the thread between the spindle and the bobbin. The doffer head, after the thread has been cut, is swung horizontally about a quarter of a revolution when its arms are opened to release the bobbin held thereby, which bobbin falls into the guide 109 on the carriage. Simultaneously with the severing of the thread the carriage is moved forward one step and during such movement of the carriage along the spinning-frame the doffer head, auxiliary doffer-guard, and thread-severing means, are all out of engagement as well as out of line with the spindles, so that there is no possibility of bending or injuring the spindles by engagement of the parts therewith during the horizontal movement of the doffer carriage. When the carriage has been moved forward one step, it is locked to the rail 2 so that the guide-tube 79 will be in vertical alinement with the spindle from which a filled bobbin has been removed, the doffer-head being in position to be brought into engagement with the adjacent filled bobbin. Each successive movement of the doffing machine positions it in proper place on the spinning frame to act upon the next spindle or bobbin thereon. When the bobbin in the guide-tube is released, it drops upon the spindle and is followed by the presser-plate 91 which moves downward in unison with the downward movement of the doffer-head. The presser-plate 91 engages the upper end of an empty bobbin on a spindle and forces the bobbin down on the spindle with sufficient vertically exerted pressure to insure proper connection between the bobbin and the spindle. When the bobbin has been properly seated, the presser plate is withdrawn through the slot 94 in the guide-tube 79 and said plate is then carried upward simultaneously with the upward movement of the doffer-head. At the proper time the bobbin magazine is rotated one space to bring the next bobbin-carrying chamber over the guide-tube 79. The several operations just described are repeated until the carriage travels to the end of the spinning frame, when an arm 26ª carried by the rock-shaft forming the fulcrum of the lever 26 engages the stationary stop 26ᵇ on the rail 2 and moves the clutch 25 out of engagement with the hub of the drive-wheel 24, so as to stop the doffer.

From the foregoing specification, it will be seen that we have produced a bobbin-doffing and placing machine which is automatic in operation and one in which the parts are driven from a single shaft. It is desirable to drive such a machine at a speed sufficient to remove and place about 120 bobbins a minute. The machine is so organized that each cam on the driven shaft operates parts that perform different functions, the movements being positive.

While we have shown and described in detail one embodiment of our invention, we recognize the fact that various changes and modifications may be made from the machine shown in the drawing without departing from the spirit and scope of our invention. Therefore we do not wish to be understood as limiting ourselves to the embodiment herein disclosed, except to the extent called for by the language of the appended claims.

We claim:

1. In combination with a spinning machine having supports for bobbin doffing and bobbin placing mechanisms, of a carriage movable upon the supports and provided with bobbin doffing and bobbin placing mechanisms, means for imparting a step by step movement to the carriage and means for holding the carriage between each impulse against movement upon its support.

2. In combination with a spinning machine, a traveling bobbin removing and bobbin placing mechanism, means for effecting an intermittent travel thereof along the front of the spinning machine, and means for holding such mechanism in fixed relation to the spindles of the spinning machine while removing and placing bobbins on the spindles.

3. In combination with a spinning machine, an intermittently traveling carriage having bobbin placing and bobbin doffing means organized so that during the periodic stoppages of the carriage movement will be imparted to the bobbin engaging means; such movement being in line with the longitudinal axes of the spindles.

4. In bobbin placing and doffing mechanism for spinning machines, a carriage supported and actuated to have a step by step movement parallel with and equal to the distance between adjacent spindles, means for locking the carriage to the spinning machine during each periodic stoppage of the carriage, bobbin placing and bobbin doffing instrumentalities supported by the carriage and organized to be moved during the travel of the carriage into position for subsequent engagement with the bobbins, the bobbin placing and bobbin doffing instrumentalities being operatively connected with means for imparting to such instrumentalities during each periodic stoppage of the carriage movement in line with the longitudinal axes of the spindles.

5. In combination with a spinning machine, a bobbin removing and bobbin placing attachment, means for connecting the attachment to the spinning machine so that it may be moved in line with the spindles, and means for holding the attachment in fixed engagement with the spinning machine while placing and while removing bobbins from the spindles.

6. In combination with a spinning machine having a supporting rail, a bobbin doffing and a bobbin placing attachment mounted thereon, means carried by the attachment for intermittently moving the same upon the rail, and means for holding the same to the rail while doffing and placing the bobbins on the spindles.

7. In an attachment for spinning machines, a carriage having operatively connected therewith means for securing the same to a frame of a spinning machine, means for doffing and placing bobbins on the spindles thereof, means for moving the carriage, and means for holding the carriage against movement when the doffing and bobbin placing instrumentalities are in vertical alinement with the spindles.

8. In a bobbin doffing attachment for spinning machines, a rail provided with recesses spaced the same distance one from the other as the distance between the spindles of the spinning machine, such rail being attached to the frame of the spinning machine, bobbin doffing means carried by a frame that engages the rail, and means for intermittently moving the frame along the rail.

9. In a doffer, a vertically reciprocable bobbin-removing device, and mechanism for moving said device step by step along a spinning frame and for reciprocating said device.

10. In combination with a spinning machine having horizontal ways attached thereto, a carriage which is intermittently movable upon the ways in front of the spindles of the spinning machine, a vertically and horizontally movable doffer head mounted upon the carriage, and means operatively connected to the doffer head for imparting horizontal movement thereto during the travel of the carriage and vertical movement to said doffer head when the carriage is at rest.

11. The combination with a spinning machine, of doffing mechanism which includes a vertically movable doffer head, and a spindle holder that is adapted to engage the spindle when the doffer head engages a filled bobbin so as to hold the spindle against upward movement during the initial upward movement of the doffer head with a filled bobbin.

12. In combination with a spinning machine, a doffer head carried by a vertically maintained support, means operatively connected to the doffer head for imparting vertical movement thereto when in vertical alinement with a spindle and means for moving the doffer head horizontally out of line with the axis of the spindles when carried upward beyond the upper ends of the spindles.

13. In combination with a spinning machine, a bobbin doffing mechanism arranged to travel along said machine and comprising a doffer head that is adapted to be moved in line with the longitudinal axis of the spindle and at right angles thereto when above said spindle, and a thread cutter coöperating with the doffer head to sever the thread between the spindle and the doffer head.

14. In bobbin doffing mechanism for spinning machines, a doffer head mounted upon a vertically movable and horizontally rotative support, the doffer head having grasping members, means for separating the grasping members at the limit of the upward movement of the doffer head and for holding the grasping members separated until the doffer head has reached the limit of its downward movement, and means for closing the grasping members upon a bobbin when the limit of the downward movement of the doffer head has been reached.

15. The combination with a spinning frame, of a bobbin removing and a bobbin placing mechanism, and means for effecting a horizontal step by step movement of such mechanism in front of the spinning frame, the steps of movement being the same as the distance between the spindles.

16. In doffing mechanism for spindles of spinning machines, a bobbin doffer carried by a frame that is movable step by step to bring the bobbin doffer in operative relation to the spindles, means for moving the doffer horizontally to position the same over a spindle, means for lowering the doffer while so positioned to a point midway of a filled bobbin upon the spindle and for then raising the doffer and the bobbin, after the bobbin has been engaged thereby.

17. In doffing and bobbin placing mechanism for spinning machines, the combination of a frame or carriage that is adapted to engage with longitudinal ways attached to a spinning machine, and means for changing the position of the parts that engage with one of the ways to move the way engaging part of the carriage below the plane of the way to admit of the removal of the frame or carriage from the spinning machine.

18. A doffer having a bobbin-removing device and means for imparting to said device a vertical movement to remove a bobbin and a horizontal movement to advance the device between successive spindles.

19. Doffing mechanism arranged to travel along a spinning frame and comprising a bobbin-grasping device and mechanism for imparting to said device vertical and horizontal movements alternately.

20. In combination with a spinning machine, a doffer head frame mounted upon a vertically and horizontally movable support, the frame of the doffer head having therethrough an opening of larger diameter than the diameter of a filled bobbin, and bobbin grasping members located above the frame of the doffer head and operatively connected thereto.

21. In doffing mechanism for spinning machines, a traveling carriage, a doffer head mounted upon a vertically movable support on said carriage, bobbin grasping members connected with means for moving the same toward each other to grasp a bobbin when the head has been moved to encircle a bobbin, and a thread cutter mounted to be moved to intersect the path of the thread when the bobbin has been removed and is held above the spindle.

22. The combination with a spinning frame, of a carriage arranged to travel along said frame, means on said carriage arranged to successively doff bobbins from the spindles of the spinning frame, and means for severing the thread running from the doffed bobbin to its spindle.

23. In doffing mechanism for ring spinning machines, a doffing device comprising bobbin-engaging members, and an annular member arranged to encircle a filled bobbin and adapted to engage the thread running between the guide wire of the thread-board and the traveler to move the thread out of the path of said bobbin-engaging members.

24. In combination with a spinning machine, bobbin doffing mechanism, and of a spindle lock that positively engages the spindle during the initial upward movement of the doffer head in removing a filled bobbin from a spindle.

25. In doffing mechanism, means for guiding a bobbin upon a spindle, and means vertically movable in the guide for engagement with the bobbin to press the same upon the spindle.

26. In doffing mechanism for spinning machines, a slotted way for guiding bobbins to spindles, and a bobbin follower which is movable in said guide to engage the upper end of the bobbin to press the same downward.

27. In bobbin placing mechanism for spinning machines, a rotatory bobbin magazine having a circumferential series of vertically disposed bobbin chambers.

28. Bobbin-placing mechanism comprising a guide adapted to direct bobbins descending by gravity onto spindles, means for advancing said guide along a spinning frame, a magazine for empty bobbins supported above said guide, and means for effecting the transfer of bobbins from said magazine to the guide.

29. In traveling doffing mechanism for spinning machines, a bobbin carrying frame having a series of vertical bobbin chambers, a bobbin guide that is movable along with the doffing mechanism to position the same in vertical alinement with the longitudinal axis of a spindle, and means for moving the bobbin carrying frame with relation to said bobbin guide to bring the chambers successively over the bobbin guide.

30. In bobbin placing mechanism for spinning machines, a bobbin magazine having a series of chambers, spring actuated bobbin retainers adjacent to the lower ends of the chambers, and means for actuating a bobbin retainer to release a bobbin from a chamber when in vertical alinement with a spindle.

31. In a doffing mechanism for spinning machines, a frame or carriage which is moved along the spinning machine, a driven shaft having thereon a plurality of cams, and means operatively connected to the cams for actuating bobbin placing and bobbin doffing instrumentalities, including thread cutting and bobbin pressing means.

32. The combination with a spinning frame, of bobbin-placing means, bobbin-seating means, and mechanism arranged to move said placing and said seating means step by step horizontally and to vertically reciprocate said seating means.

33. In doffing mechanism for spinning machines, a longitudinally slotted guide tube for bobbins, a presser plate movable therein and means for imparting both vertical and horizontal movement to the presser plate.

34. Bobbin-placing mechanism comprising a guide adapted to direct bobbins descending by gravity onto spindles, and means for advancing said guide along a spinning frame to supply successive spindles with bobbins.

35. In doffing mechanism for spinning machines, a magazine having a plurality of compartments adapted to contain empty bobbins, and spring-pressed stops at the lower ends of said compartments adapted to support the bobbins in the magazine.

36. A doffer mechanism for spinning frames comprising an intermittently movable carriage and an intermittently actuated doffing mechanism.

37. A doffer comprising a carriage, means on the carriage for removing full bobbins from the spindles, means on the carriage for supplying empty bobbins to the empty spindles, and means on the carriage for intermittently engaging a part on the spinning frame to move the carriage a determined distance at determined intervals.

38. A doffer for spinning frames, comprising a carriage, means on the carriage for removing bobbins from the spindles of the spinning frame, means on the carriage for supplying bobbins to the spindles, means for intermittently propelling the carriage, and means for intermittently locking the carriage against movement.

39. A doffer mechanism for spinning frames, comprising a carriage having means for removing full bobbins from the spindles and supplying empty bobbins thereto, means for propelling the carriage, means for locking the carriage against movement, and means for alternately operating the propelling and locking means.

40. An automatic bobbin doffer for spinning machines including the doffer frame, means within the doffer frame to automatically feed the bobbins to the spinning machine, and means to automatically and intermittently move said doffer along said spinning machine.

41. A doffer mechanism for spinning frames, comprising a carriage, means in engagement therewith for intermittently moving the carriage along the spinning frame, and doffing mechanism operatively connected to and supported by the carriage.

42. A doffer mechanism for spinning frames, comprising a carriage supported by and movable at intervals determined distances along the spinning frame, means for holding the carriage against movement along the spinning frame upon completion of each movement for the determined distance, means movable with the carriage for removing a filled bobbin from a spindle, and means also movable with the carriage for placing an empty bobbin upon an empty spindle.

43. A doffing mechanism for spinning frames, comprising a carriage that travels with periodic stoppages along the spinning frame and is held in fixed engagement with the spinning frame during each periodic stoppage, means supported by the carriage and operatively organized to effect movements in line with the longitudinal axes of the spindles to place an empty bobbin upon a spindle and simultaneously operating means also movable in line with the longitudinal axes of the spindles for removing a filled bobbin from a spindle.

44. A doffing mechanism for spinning frames comprising a carriage that is moved along the spinning frame with successive periods of travel and stoppages equaling the distance between the spindles, bobbin placing and bobbin removing means synchronized to reciprocate in line with the longitudinal axes of the spindles to place bobbins thereon and to remove bobbins therefrom during the periodic stoppages of the carriage, and means for effecting during travel of the carriage completion of the doffing and a positioning of the doffing mechanism prior to the next stoppage of the carriage.

45. A doffer mechanism for spinning frames comprising an intermittently movable carriage and bobbin removing means on said carriage.

46. In combination with a spinning frame, doffing mechanism mounted upon a carriage, a motor on the carriage for actuating the doffing mechanism and for moving the carriage along the spinning frame, and means for stopping the doffing mechanism and travel of the carriage when the carriage reaches the limit of its travel in one direction upon the spinning frame.

47. In doffing mechanism for spinning frames, a spinning frame having longitudinal ways attached thereto, a carriage mounted upon said ways and provided with means for effecting an intermittent travel of the carriage along the spinning frame, doffing mechanism mounted upon the carriage, a motor on the carriage for actuating the carriage and the doffing mechanism, and means for placing the motor out of gear with the carriage and with the doffing mechanism.

48. In combination with a spinning frame, and means attached thereto for supporting a carriage and a stop for limiting the movement of the carriage in one direction, of a carriage provided with doffing mechanism, a motor for actuating the doffing mechanism and for moving the carriage along the spinning frame, means on the carriage for engagement with the stop to place the motor out of gear with the doffing mechanism and the propelling mechanism for the carriage, and manually operated means on the carriage for effecting the same end.

49. In a doffing machine for spinning frames, a frame, doffing means, and a motor mounted upon the frame and operatively connected to said doffing means, the drive shaft of the motor being in line with the direction of travel of the doffer frame upon the spinning frame.

50. In doffing mechanism for spinning frames, a guide tube for bobbins maintained so that the lower end will be adjacent to the plane of the upper ends of the spindles of the spinning frame, said guide tube being cut away to admit of the passage of the upper ends of the spindles or bobbins thereon through said cut away portion.

51. A doffer head comprising an apertured base, a plurality of independently movable bobbin grasping means associated with the base to be movable inward and beyond the inner circumference of the aperture through the base, resilient means for moving the bobbin-grasping means inward to engage a bobbin and vertically reciprocating supporting means for the doffer head.

52. A doffer head comprising a base plate having an aperture therethrough which is of greater diameter than the filled bobbin, a plurality of bobbin-grasping members maintained above the base, and separate means for closing the grasping members.

53. An instrumentality for removing bobbins from the spindles of a spinning frame comprising a plurality of bobbin-engaging means, and a support therefor that is vertically movable over a bobbin and is adapted to encircle the same, each one of the bobbin-engaging means being connected to the support to be susceptible of independent movement to engage a bobbin.

54. A doffer mechanism for spinning machines, comprising a movable doffer frame, means on the doffer frame for removing filled bobbins from the spindles of the spinning machine, means carried by the doffer frame for supplying empty bobbins to the empty spindles, bobbin-seating means comprising a resiliently supported presser plate carried by the doffer frame to be vertically movable thereon for engagement with the upper end of a bobbin when placed upon a spindle, and means for holding the doffer frame against movement while the presser plate is in engagement with a bobbin on a spindle.

55. In a doffing mechanism for spinning frames, a carriage, means for associating the carriage with the spinning frame for movement along the spinning frame, a bobbin-removing instrumentality associated with the carriage and means for reciprocating the bobbin-removing instrumentality when in vertical alinement with the spindles of the spinning frame.

56. In doffing mechanism, a thread cutter having a movable blade, a standard upon which the blade is mounted, means for reciprocating the standard, a rock shaft operatively connected to the movable blade of the thread cutter, an arm attached to the rock shaft, guides for the standard, and a projection with which the arm on the rock shaft engages to actuate the movable blade of the thread cutter.

57. The combination with a spinning frame, a bobbin-removing and a bobbin-placing mechanism mounted for horizontal travel along the front of the spinning frame, and means for effecting a step-by-step movement of such mechanism.

58. The combination with a series of vertical bobbin supports, a bobbin-removing device located in the vertical plane of and above said supports, means for reciprocating said device toward and away from said bobbin supports, and means for producing a relative traveling movement between the supports and the bobbin-removing device to position the latter adjacent to successive supports.

59. In apparatus for operating upon bobbins, in combination, a plurality of bobbin supports, a bobbin-engaging means comprising a plurality of relatively movable grasping members, means for moving the bobbin-engaging means along the plurality of bobbin supports, and means for reciprocating the bobbin-engaging means in a straight line toward and away from successive bobbin supports.

60. In combination with a spinning machine having supports for bobbin-doffing and bobbin-placing mechanisms, of a carriage movable upon the supports and provided with bobbin-doffing and bobbin-placing mechanisms, and means for imparting a step-by-step movement to the carriage to position the bobbin-doffing and bobbin-placing mechanisms in operative relation to the spindles successively.

61. In combination with a spinning machine, traveling bobbin-removing and bobbin-placing mechanism, means for effecting an intermittent travel thereof along the front of the spinning machine, and means for holding such mechanism in fixed relation to the spindles of the spinning machine while removing and placing bobbins on the spindles.

62. In combination with a spinning machine, a bobbin-removing and bobbin-placing attachment, means for connecting the attachment in movable engagement with the spinning machine so that it may be moved horizontally along the spinning machine in line with the spindles thereof, and means for holding the attachment in fixed engagement with the spinning machine while placing and while removing bobbins from the spindles of the spinning machine.

63. A doffer mechanism for spinning frames, comprising a carriage adapted to be supported by a spinning frame, said carriage being movable at intervals determined distances along the spinning frame, means for moving the carriage along the spinning frame and holding the carriage against movement, means movable with the carriage for removing a filled bobbin from a spindle, and means also movable with the carriage for placing an empty bobbin upon an empty spindle.

64. In a doffing mechanism for spinning frames, a carriage having means for associating the same with a spinning frame to be movable along the spinning frame, bobbin-removing and bobbin-placing instrumentalities associated with the carriage, means for holding the bobbin-removing and bobbin-placing instrumentalities against movement along the spinning frame when such instrumentalities are in vertical alinement with adjacent spindles of the spinning frame, and means for reciprocating vertically the bobbin-removing instrumentality to engage and remove a bobbin from a spindle.

65. The combination with a spinning-frame, of doffing mechanism mounted to travel thereon, said doffing mechanism comprising bobbin-removing means, driving means, a clutch to connect said bobbin-removing means to said driving means, and means arranged to be operated by a stationary device on the spinning-frame for throwing out said clutch and automatically stopping the doffing mechanism.

66. A doffer mechanism for spinning frames, comprising a support that is associated with the spinning frame to be movable along the front of the spinning frame, means associated therewith for removing filled bobbins successively from the spindles of a spinning frame, means for supplying bare bobbins to the empty spindles, and bobbin-seating means which is adapted to have an upward movement independent of the support therefor when moved into engagement with the upper end of a bobbin in pressing the same upon a spindle.

67. A doffer mechanism for spinning frames comprising a carrier for the doffer mechanism, a part of the doffing mechanism comprising bobbin-seating means mounted on the carrier and associated therewith to be movable both vertically and horizontally.

68. A bobbin-removing means for spinning frames comprising a carriage, means for associating the bobbin-removing means with the carriage so that a vertical reciprocatory movement may be imparted thereto between the horizontal movements of the carriage.

69. A doffer for spinning frames comprising a carriage, a bobbin-removing device associated with the carriage, and means for imparting to said device a vertically reciprocating movement when in vertical alinement with the spindles, said bobbin-removing device being movable horizontally with its support when positioned above the upper ends of the spindles.

70. In a doffer for spinning frames, a carriage, means for associating an empty bobbin with a spindle, said means being mounted on the carriage to be horizontally movable therewith, a vertically movable means for seating the bobbins upon the spindles of the spinning frame, and a vertically movable means for grasping and removing a filled bobbin from a spindle.

71. In a doffer for spinning frames, a carriage, means thereon for placing bobbins on spindles, and a bobbin-seater mounted on the carriage and movable horizontally with the carriage and vertically for engagement with a bobbin when placed upon a spindle.

72. The combination with means for doffing a bobbing from its spindle, of thread-severing means, and means for moving said severing means as a whole into position to sever the thread between the bobbin and its spindle.

73. A doffer comprising a frame, donning means, a structure mounted to slide vertically with relation to said frame, a part mounted to slide horizontally with relation to said structure toward and from said donning means, a bobbin-pressing means carried by said part, and means for operating the structure and the parts carried thereby.

74. The combination with a spinning frame having in rigid engagement therewith fixed means, with which a propelling member is adapted to engage, of a doffer adapted to be mounted on the spinning frame for movement longitudinally along said frame, said doffer comprising a framework, a propelling member mounted in said framework to engage with the fixed means on the spinning frame, such member being moved intermittently to effect a step-by-step travel of the doffer along the spinning frame, bobbin-doffing mechanism supported by said framework, and driving and timing instrumentalities between said propelling member and said doffing mechanism, whereby when said doffer is moved along the spinning frame the doffing mechanism will be actuated and properly timed with respect to the spindles.

75. In a doffer for spinning frames, a frame, a donning tube thereon, a structure mounted to slide with relation to said frame, a part mounted to slide with relation to said structure, a bobbin-seater carried by said part and movable therewith into and out of relation to said donning tube, and means for moving said structure and said part.

76. In a doffer for spinning frames, a carriage, a cross-head mounted to slide with relation to said carriage, a part mounted to slide with relation to said cross-head, a bobbin-seater carried by said part, and means for moving the carriage, the cross-head and the part that carries the bobbin-seater.

77. A doffer comprising a carriage adapted to be mounted upon a spinning frame to move longitudinally with relation to the spinning frame, a bobbin-placing means maintained in a constant vertical position relative to the spindles of the spinning frame, a bobbin-seater maintained by means on the carriage, and means for moving the bobbin-seater so that it will have a vertical movement to seat a bobbin and a horizontal movement prior to its engagement with the next adjacent bobbin.

78. In a doffer for spinning frames, a carriage or support, bobbin-engaging means on said carriage or support which is adapted to press a bobbin downward to seat the same upon a spindle of a spinning frame, the same comprising a horizontally movable element operatively connected with said bobbin-engaging means, and means for moving the same alternately vertically and then horizontally with relation to the carriage.

79. In a machine for placing bobbins upon the spindles of a spinning-frame, the combination of a carriage mounted to travel along the front of the spinning-frame, means on said carriage for supplying bobbins to the spindles, and means for pressing the bobbins onto the spindles, the last mentioned means comprising a bobbin-pressing part which is mounted for movement on said carriage both horizontally and vertically, the downward movement of said part being effected when in vertical alinement with a spindle.

80. Doffing mechanism for spinning frames comprising a carriage arranged to travel along a spinning frame, and an intermittently actuated doffing mechanism mounted on said carriage.

81. A doffer comprising a carriage, a structure mounted to slide vertically with relation to the carriage and travel with the carriage along the spinning frame, a part mounted to slide horizontally with relation to the structure, bobbin-engaging means carried by said part, and appropriate operating means associated with the elements hereinbefore mentioned.

82. A bobbin-removing device for spinning frames comprising a reciprocatory element mounted upon its carrier to be lowered vertically over a bobbin and when so lowered to encircle the bobbin, means associated with the reciprocatory element for engagement with the yarn on the bobbin, and a yarn-severing means operative to sever the yarn when a bobbin has been disassociated from the spindle.

83. In a doffing mechanism for spinning frames, a support having means for associating the same in movable engagement with a spinning frame, propelling means carried by said support which is timed to move the support and instrumentalities carried thereby along the spinning frame with proper relation to the functions of the parts constituting the doffer, a bobbin-placing means comprising a vertically maintained guide tube to which bare bobbins are supplied to be placed upon the bare spindles of the spinning frame, a bobbin-seating means maintained in relation to the guide tube for engagement with the upper end of a bobbin to press the same upon a spindle, a vertically reciprocatory bobbin-removing means maintained to be lowered about a filed bobbin and then raised to separate the filled bobbin from the spindle, a thread-cutter in operative relation to the bobbin-removing means to sever the thread after the removal of a bobbin from a spindle, and means for supplying bobbins to the guide tube.

84. In bobbin-placing means for spinning frames, a support, a guide-tube maintained by the support to be brought successively in vertical alinement with the spindles of a spinning frame by movement of the support along the spinning frame, means for supplying bobbins to the guide tube, means for retaining a bobbin in the guide tube prior to associating the same with a bare spindle of the spinning frame, means for engagement with the upper end of a bobbin within said guide tube, and means for imparting a vertical movement to the means that engages the upper end of the bobbin when within the guide tube.

85. In bobbin-placing mechanism for spinning frames, a support which is movable along a spinning frame, a vertically maintained guide tube associated with the movable support and provided with a vertical slot, a bobbin-engaging member which passes through said slot and is movable within the guide tube and means for imparting movement to the bobbin-engaging member.

86. In a doffer, a bobbin-guide arranged to direct bobbins onto spindles, the bobbins passing along said guide by gravity, means for imparting to said guide a series of intermittent movements to position the guide above successive spindles, and means for supplying bobbins to said guide.

87. The combination with a spinning frame, of bobbin-placing means comprising a guide arranged to direct bobbins descending by gravity onto the spindles of the spinning frame, means for advancing said guide along the spinning frame, and an elevated bobbin magazine arranged to be moved with said guide along the spinning frame and also to have a movement with relation to said guide to position the bobbins in the magazine for delivery to said guide.

88. In doffing mechanism for spinning frames, a carriage which is movable along a spinning frame when associated therewith, bobbin-placing means and bobbin-removing means operatively maintained in line with the spindles of the spinning frame and spaced one from the other a distance equal to the distance between the spindles, and means for vertically reciprocating the bobbin-removing means when in vertical alinement with a spindle.

89. In doffing mechanism for spinning frames, a support which is movable along a spinning frame when associated therewith, bobbin-placing means associated with the support to have an advance equal to the distance between the next adjacent spindles of the spinning frame and a stoppage when in vertical alinement with a spindle, a member constituting a part of the bobbin-placing means to which a movement in vertical alinement with the spindle is imparted to seat the bobbin on the spindle, a magazine for empty bobbins maintained above the plane of the bobbin-placing means, means for supplying bobbins from the magazine to the bobbin-placing means, and means for actuating the parts hereinbefore mentioned.

90. In doffing mechanism for spinning frames, a carriage adapted to be associated with a spinning frame and provided with means for moving the carriage along the spinning frame, a bobbin-placing means comprising a part which is mounted to move horizontally and a coöperating vertically reciprocatory part, a bobbin-removing means associated with the carriage and spaced relative to the bobbin-placing means a distance therefrom equal to the distance between the next adjacent spindles of the spinning frame, means for reciprocating vertically the bobbin-removing means, and operating mechanism properly timed with relation to the spacing and movement of the parts.

91. In a doffer for spinning frames, a supporting structure adapted to be associated with a spinning frame, a bobbin-removing instrumentality mounted on the supporting structure for vertical reciprocation thereon, a bobbin-placing instrumentality attached to said supporting structure, a part coöperating with the bobbin-placing instrumentality to which a vertical reciprocatory movement is imparted, and means associated with the supporting structure for moving the structure and the bobbin-placing and bobbin-removing instrumentalities.

92. In an attachment for spinning frames, a carriage having operatively connected therewith means for associating the same in horizontal movable engagement with the spinning frame, means for effecting a travel of the carriage along the spinning frame, means for removing bobbins from the spindles of the spinning frame, means for placing bobbins on the spindles, means for moving vertically a part of the bobbin-removing means, and means for moving vertically a part of the bobbin-placing means, the vertically movable parts being actuated when the bobbin-removing and bobbin-placing means are in vertical alinement with the spindles.

93. A doffer mechanism for use in combination with a spinning machine provided with means for associating a carriage with the spinning machine to be movable horizontally along the spinning machine, a bobbin-removing means maintained by the carriage to have a vertical movement imparted thereto when positioned in vertical alinement with the spindles, and means for moving the carriage and the bobbin-removing means.

94. A doffer mechanism for spinning frames comprising a support adapted to be attached to a spinning frame and to be movable along the same, a bobbin-removing means maintained in vertical movable engagement with the support, means for moving the support along the spinning frame to successively position the bobbin-removing means in vertical alinement with successive spindles, and means for reciprocating the bobbin-removing means when in vertical alinement with the spindles.

95. In combination with a spinning machine, a bobbin-doffing instrumentality adapted to be attached to the spinning machine and moved in line with the spindles thereof, such instrumentality comprising means which are maintained to be reciprocated vertically when in vertical alinement with the spindles, a thread-cutter maintained in operative relation to the bobbin-doffing means, and means for actuating the hereinbefore mentioned instrumentalities.

96. In doffing mechanism for spinning machines, a support arranged to travel along a spinning machine, bobbin-engaging means carried by the support, means for moving the bobbin-engaging means downwardly over a filled bobbin when in vertical alinement with a spindle and for effecting vertical movement upward of the bobbin-engaging means to position the latter and a bobbin carried thereby above the upper end of the spindles, and means operated to sever the yarn connecting the bobbin with the spindle from which the bobbin has been taken.

97. In combination with a spinning frame, a carriage associated with the spinning frame to move lengthwise thereon; a bobbin-removing means mounted on the carriage to have vertical movement when in vertical alinement with the spindles, said bobbin-removing means comprising a part having an aperture therethrough which is of larger diameter than the diameter of a filled bobbin and which encircles a filled bobbin when moved downward over the same and a plurality of independently movable members for engagement with the yarn on a filled bobbin operatively connected to the part which encircles the bobbin; means for moving said parts vertically upward to carry a filled bobbin therewith above the upper end of a spindle; and means for actuating and timing the movements of the carriage and the bobbin-removing instrumentalities associated therewith.

98. In bobbin-removing mechanism for ring spinning frames, a vertically reciprocatory part arranged to be moved downward to encircle a filled bobbin and engage the yarn running between the traveler on the ring and the thread guide of the spinning frame, bobbin-engaging members maintained by said vertical reciprocatory part to be movable in engagement with the yarn on the bobbin, means for moving the bobbin-encircling part and the bobbin-engaging members upward to carry a filled bobbin maintained thereby above the upper end of the spindle, means for moving said instrumentalities horizontally when above the spindle, means for releasing the filled bobbin, and means for guiding the released bobbin into a receptacle.

99. In a doffing machine, a bobbin-removing instrumentality provided with a part adapted to encircle a filled bobbin while on a spindle and further provided with bobbin-grasping members, means operatively associated therewith for effecting engagement of the bobbin-grasping members with the yarn upon a bobbin when the bobbin is in place upon a spindle, means for moving the bobbin-removing instrumentality and a filled bobbin carried thereby upward above the spindle, and a thread-cutter coöperating with the bobbin-removing instrumentality.

100. In a doffing mechanism for ring-spinning machines, a bobbin-removing instrumentality comprising a lower part having therethrough an aperture which is of greater diameter than a filled bobbin, such part being adapted to engage and move during its downward movement the thread extending between the traveler and the thread guide of the spinning machine beyond the path of the grasping members of the bobbin-removing instrumentality, bobbin-grasping members associated with the apertured part and positioned above the same, and means for imparting a vertical reciprocating movement to the bobbin-removing instrumentalities.

101. In doffing mechanism, a longitudinally slotted tube for guiding a bobbin upon a spindle, a vertically reciprocatory means having a part movable within the tube for engagement with a bobbin, and means for retaining a bobbin in the tube below the reciprocatory means.

102. In doffing mechanism for spinning frames, a guide tube into which bobbins are delivered prior to placing the same upon a spindle, and means movable in said guide tube to engage the upper end of a bobbin therein and press such bobbin downwardly.

103. The combination with a spinning frame, of bobbin-placing means, a magazine having withdrawable spring-pressed bobbin supporting devices, means for effecting a relative movement between the magazine and the bobbin-placing means, and means for successively operating said bobbin supporting devices.

104. In doffing mechanism for spinning frames, a support that is movable along the spinning frame, a guide tube maintained in vertical relation to the support and provided with an opening through which the upper end of a bobbin on a spindle may pass as the tube is moved horizontally.

105. In bobbin-placing mechanism, a bobbin-guide tube, a bobbin magazine located at the upper end of said tube, means for advancing said tube and said magazine together along a spinning frame, and means for effecting a relative movement between the magazine and the tube to position the bobbins above the latter.

106. The combination with a spinning frame, of bobbin-placing means, a bobbin-magazine having a plurality of compartments and having withdrawable means at the lower ends of said compartments, means for advancing the magazine and the bobbin-placing means along a spinning frame, means for effecting a relative movement between the magazine and the bobbin-placing means, and means for successively operating the withdrawable means on the magazine to release the bobbins therefrom.

107. The combination in doffing mechanism for spinning frames, of a carrier for bobbin-removing and bobbin-placing mechanisms which are movable with the carrier along the spinning frame so that such mechanisms will be positioned and maintained in vertical alinement with adjacent spindles in removing filled bobbins from the spindles and in placing empty bobbins thereon; a vertically reciprocating bobbin-removing mechanism associated with means on the carrier whereby a movement downward in vertical alinement with the spindles is imparted to the bobbin-removing means and also an upward vertical movement to carry the bobbin above the spindle; a bobbin-supply-tube supported by the carrier and maintained parallel with the line of vertical reciprocation of the bobbin-removing means; means for severing the thread after the filled bobbin has been raised from its spindle; means for seating the empty bobbin placed on the spindle by pressure upon the upper end of the bobbin; a magazine from which empty bobbins are fed to the supply-tube; a receptacle for the filled bobbins movable with the carrier; and means for directing the filled bobbins when separated from the bobbin-removing means into the receptacle.

108. In a doffer, a carriage arranged for movement longitudinally of the front of a spinning frame, doffing mechanism on the carriage, means on said carriage for holding bobbins, said means comprising two instrumentalities, one having spaces therein to contain bobbins, the other serving to support bobbins located in said spaces; means for actuating the bobbin-supporting means to effect the discharge of bobbins from said spaces, and tubular means leading from a point near the said instrumentalities to a point adjacent to and above the line of spindles on the spinning frame for receiving the released bobbins and guiding them to the spindles.

109. In a doffer for spinning frames, a carriage arranged to travel along the side of the spinning-frame, a magazine adapted to be operatively associated with the carriage and having spaces therein to contain bobbins, means for effecting a discharge one at a time of the bobbins from the spaces, and a guide tube on said carriage into which the bobbins are deposited by gravity when released.

110. In a doffer, a carriage arranged for movement longitudinally of the front of a spinning frame, an instrumentality operatively associated with said carriage and having spaces therein to contain bobbins, an instrumentality to support bobbins in said spaces, means for actuating the supporting instrumentality to effect a discharge of bobbins from said spaces, and a guide tube into which the released bobbins are discharged.

111. In a doffer, a carriage arranged for movement longitudinally of the front of a spinning frame; doffing mechanism on the carriage; means operatively associated with the carriage for holding bobbins, said means comprising two instrumentalities, the upper one providing a bobbin compartment and the lower one serving to support the bobbins in said compartment; means for moving one of the instrumentalities to release a bobbin and means for guiding the released bobbin to the spindles.

112. In a doffer arranged for movement longitudinally of the front of a spinning frame, a support, an elevated bobbin magazine carried by said support, a tube leading from a point below the magazine to a point adjacent to the upper ends of spindles on the spinning frame, and means for discharging bobbins from the magazine and depositing them in the tube.

113. In doffing mechanism for spinning machines, a magazine having a plurality of vertically disposed tubular compartments adapted to contain empty bobbins, and a series of independently movable stops at the lower ends of said compartments adapted to support the bobbins.

114. In a doffing machine for spinning frames, a vertically reciprocatory bobbin-removing means having a plurality of movably sustained bobbin-engaging members each having an independent movement in grasping a bobbin and a uniform movement in releasing a bobbin.

115. In doffing mechanism for spinning frames, means for removing filled bobbins from spindles, comprising a reciprocatory member provided with a bobbin-encircling portion, and a plurality of independently movable bobbin-engaging members which are adapted to impinge upon the yarn about the bobbin, such members being disposed above the lower portion of the bobbin-encircling portion of the reciprocating member.

116. A doffer for spinning frames, comprising in combination, a horizontally movable carriage that is caused to travel along the front of the spinning frame with periods of stoppages which locate the bobbin-removing means in the carriage in vertical alinement with the spindles of the spinning frame, and bobbin-removing means associated with the carriage to move horizontally therewith, and to have a vertical reciprocatory movement imparted thereto during the stoppages of the carriage.

117. The combination with a spinning machine having a doffer-guiding rail thereon, of a doffing machine having a roller adapted to engage said rail; and means for vertically adjusting said roller with relation to the frame of the doffing machine.

118. The combination with a spinning frame having a doffer-guiding rail thereon, of a doffing machine having a pair of rollers adapted to engage said rail; and a device upon which said rollers are mounted, said device being adjustably supported on the doffer frame and adapted to cause vertical movement of said rollers with relation to said doffer frame.

119. In a doffing mechanism for spinning machines, a bobbin-magazine having a plurality of bobbin compartments, and independently operable means at the lower ends of the respective compartments for supporting the bobbins therein.

120. The combination with a spinning frame having vertical spindles, of a doffing machine comprising a bobbin magazine positioned in a plane above the upper ends of said spindles; and tubular means extending from a point adjacent to the magazine, to a point adjacent to the spindles and adapted to guide bobbins from said magazine and to direct them onto the spindles, the bobbins descending by gravity through said tubular means.

121. The combination with a spinning frame having upright spindles, of a bobbin guide arranged to travel along said frame into position above successive spindles for directing empty bobbins onto said spindles, the bobbins descending along said guide by gravity, a magazine located adjacent to the upper end of said guide and arranged to supply empty bobbins thereto, and appropriate operating mechanism.

122. The combination with a spinning frame having spindles, of a traveling doffing machine comprising a tube adapted to successively guide bobbins onto a series of said spindles; a bobbin magazine; means for effecting the discharge of bobbins from said magazine into said guide tube, the bobbins descending through said tube onto a spindle by gravity; and means for pressing the bobbins more firmly onto the spindles.

123. In a doffer, a vertically reciprocable bobbin-seating device, and mechanism for moving said device step-by-step along a spinning frame and for reciprocating said device.

124. A doffer having a bobbin-seating device, and means for imparting to said device a vertical movement to seat a bobbin, and a horizontal movement to advance the device from one spindle of the spinning machine to the next spindle.

125. In a doffing machine, a carriage arranged to travel along a spinning frame, a bobbin-engaging device associated with said carriage for vertical reciprocation along the axis of a spindle on the spinning frame, rotary cam means on the carriage, and means operatively connecting said cam means to said bobbin-engaging device for operating the latter.

126. A doffing machine comprising a carriage, a doffing means mounted thereon for vertical reciprocation, means for propelling the carriage along the spinning-frame, a rotary shaft having cams thereon, and operative connections between said cams and said doffing means and propelling means.

127. A traveling doffing machine comprising operating means, driving means therefor, and means operable by engagement with a part on the spinning-frame for automatically disconnecting said driving means form said operating means under certain conditions.

128. A doffing machine comprising operating means, driving means therefor, clutch means for connecting said driving means to said operating means, and a stationary stop adapted to disengage said clutch means when the doffer reaches the end of the spinning frame.

129. A traveling doffing machine comprising operating means, an electric motor for driving said operating means, a clutch connection between said motor and said operating means, and means operable by engagement with a part on the spinning-frame for automatically disengaging said clutch connection under certain conditions.

130. A doffing machine comprising means for removing bobbins from spindles, and means on the doffer for engaging the spindles to prevent their withdrawal from their supports.

131. The combination with a spinning machine having a plurality of spindles, of a doffing machine adapted to be associated with said spinning frame, and comprising means for lifting bobbins from said spindles, and means for preventing withdrawal of the spindles during such lifting operation.

132. In a doffer, bobbin-engaging means, bobbin-placing means, and mechanism arranged to move said engaging means and placing means step by step horizontally and to vertically reciprocate said engaging means.

133. In a doffer, a bobbing-engaging device and a bobbin-guide tube spaced apart the distance between two adjacent spindles of a spinning frame, and mechanism for advancing said device and said tube along the spinning frame and for reciprocating said device.

134. The combination with a spinning frame, of a carriage arranged to travel along said frame, a bobbin-engaging device, means for imparting to said device a vertical reciprocation in line with the axes of successive spindles to doff the bobbins therefrom, and means for successively severing the threads running from the doffed bobbins to the spindles.

135. The combination with a spinning frame, of bobbin-placing means, a magazine having plurality of bobbin compartments and having bobbin supports at the lower ends of said compartments, means for advancing the magazine and the bobbin-placing means together along a spinning frame, means for effecting a relative movement between the magazine and the bobbin-placing means, and means for operating said supports on the magazine to transfer the bobbins therefrom.

136. The combination with a spinning frame, of bobbin-placing mechanism comprising a support mounted to travel along said frame and having thereon a bobbin-guide along which bobbins descend by gravity, a bobbin magazine having a plurality of bobbin compartments, the upper end of said bobbin-guide being positioned beneath one of said compartments, means for controlling the passage of the bobbins from the magazine, and means for bodily moving the magazine with relation to said bobbin guide to successively position the compartments above said guide.

137. In bobbin-placing mechanism, a bobbin magazine having a plurality of compartments and having spring-pressed stops at the lower end of said compartments, bobbin-placing means, said means and the magazine being arranged to have a relative movement, and means for operating said spring-pressed stops.

138. In a doffer, bobbin-grasping means, bobbin-placing means and bobbin-seating means, and mechanism for moving said grasping, placing and seating means along a spinning frame, and for reciprocating said grasping and said seating means.

139. The combination with a spinning frame, of a bobbin-grasping device, a bobbin-guide tube and a bobbin-seating device, and mechanism for imparting to said devices and said tube an intermittent advance along the spinning frame and for reciprocating said devices when in alinement with spindles.

140. In combination, bobbin-engaging means, bobbin-placing means, bobbin-seating means and mechanism for causing a horizontal travel of all of said means and for imparting a vertical reciprocation to said engaging and seating means at intervals.

In testimony whereof, we affix our signatures in presence of two witnesses.

ARTHUR G. BOOZER, JR.
GEORGE HILL.

Witnesses:
C. W. HOWE,
JNO. M. ANDERSON.